Figure 1:
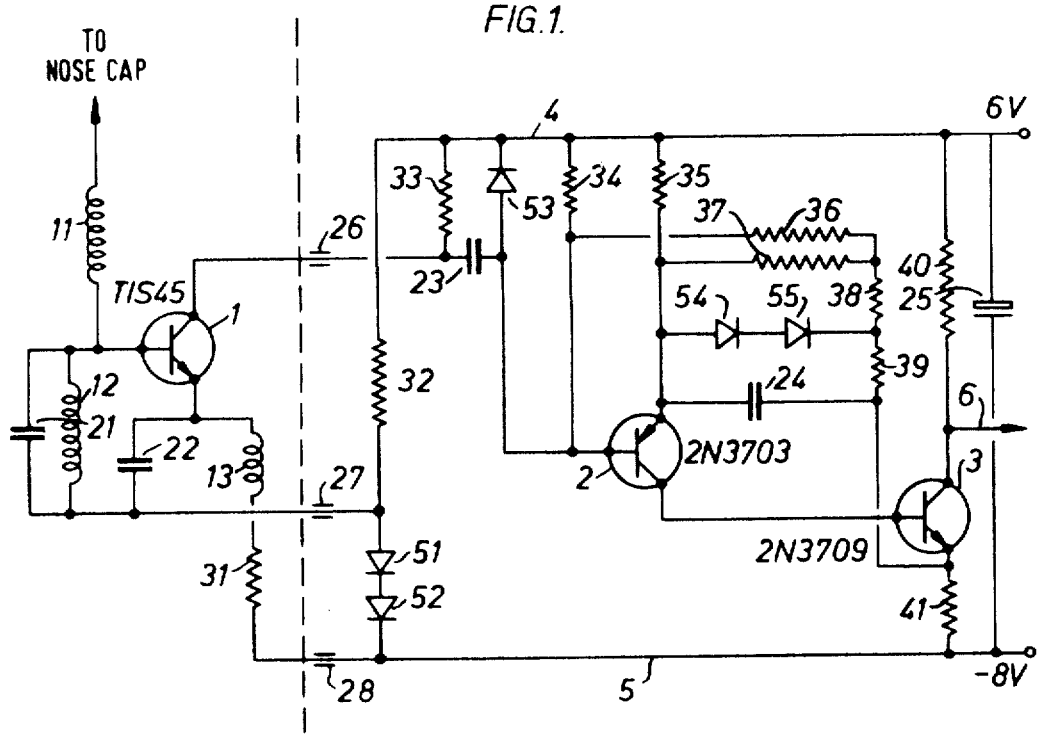

United States Patent

[11] 3,594,792

[72] Inventors: Edmund John Gowler, Sunbury-on-Thames; Patrick Anthony McDonald, Staines, both of, England
[21] Appl. No. 767,067
[22] Filed Oct. 10, 1968
[45] Patented July 20, 1971
[73] Assignee Electric & Musical Industries Limited, Hayes, England
[32] Priority Oct. 11, 1967
[33] Great Britain
[31] 46502/68

[54] PROXIMITY SENSING DEVICES
4 Claims, 7 Drawing Figs.

[52] U.S. Cl. ................................................. 343/7
[51] Int. Cl. ................................................. G01s 9/04
[50] Field of Search ........................................ 343/7 PF

[56] References Cited
UNITED STATES PATENTS
2,931,300  4/1960  Lord et al. .................. 343/7 PF X Primary Examiner—Richard A. Farley
Assistant Examiner—T. H. Tubbesing
Attorney—Fleit, Gipple & Jacobson ABSTRACT: An improved proximity fuse is described in which an oscillator circuit supplies electrical oscillations to a radiating and receiving antenna. In the presence of a target, the impedance of the antenna, and therefore the current drawn by the oscillator circuit changes due to interaction between radiated and reflected energy. At target-to-antenna distances of less than half wavelength of the electrical oscillation, the impedance variation is substantially greater than that at greater distances and is dependent upon the angle of approach of antenna and target. If the two are moving parallel one to the other, so that a missile carrying the fuse would pass a target without hitting it the antenna impedance (and therefore the current drawn by the oscillator) increases sharply; conversely, if the two are approaching head-on corresponding to a direct hit condition, the impedance (and current) decreases sharply. A trigger circuit is coupled to the oscillator circuit by a sensing means which produces a signal dependent on changes in the current drawn by the oscillator circuit. If the said signal is large enough to overcome a predetermined bias it causes triggering of the trigger circuit. The trigger is therefore not triggered until the distance from the target is less than a half of the wavelength of the radiated oscillation and then only on a near miss condition. Another trigger may be provided, set for the direct hit condition.

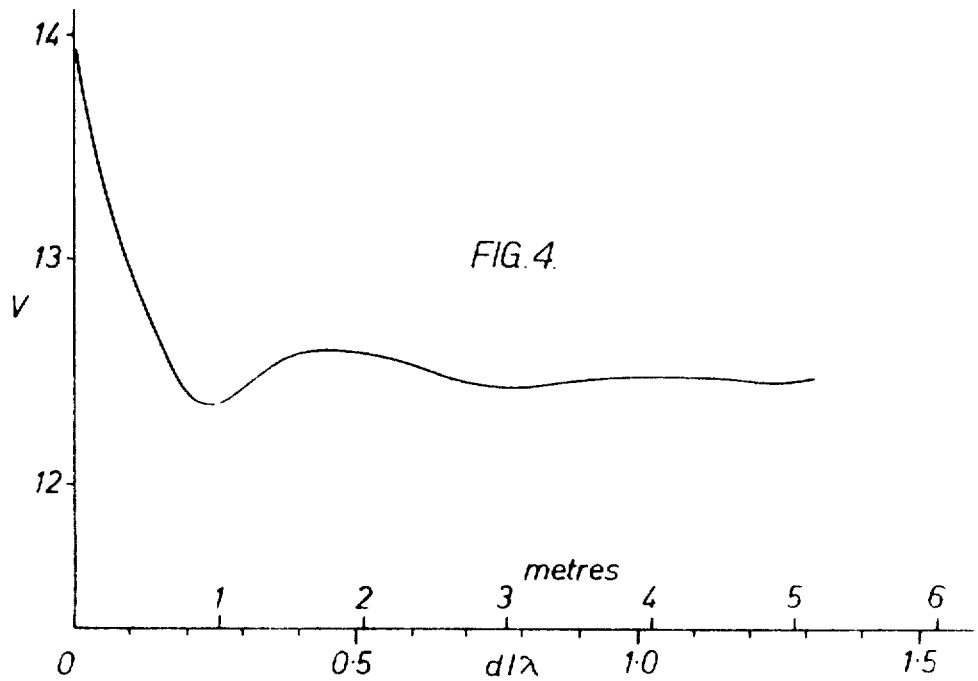
FIG. 4.
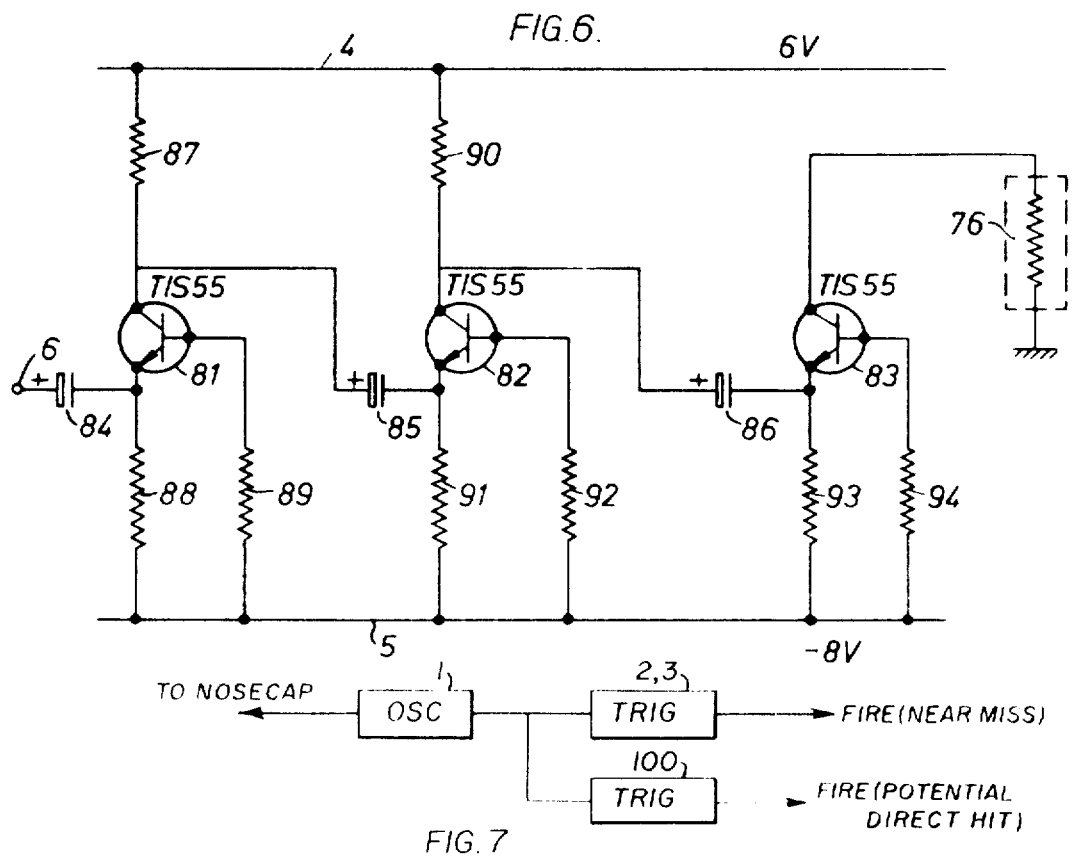
FIG. 6.
FIG. 7

PROXIMITY SENSING DEVICES

This invention relates to proximity fuzes.

It is an object of the invention to provide an improved proximity fuze.

According to the invention there is provided a proximity fuze including:

a. an oscillating circuit for generating electrical oscillations,
b. antenna means coupled to said oscillator circuit for radiating oscillation energy supplied by said circuit and for receiving portions of said energy reflected from a target body,
c. trigger means having a normally quiescent state and arranged, when triggered from said state, to produce a fuzing signal,
d. sensing means for producing a control signal representing the current drawn by said oscillator and for applying said signal to said trigger means in a sense to tend to trigger said trigger means as said current increases,
e. said trigger means including a biassing circuit to prevent said trigger means for triggering on extrema of said control signal which occur each time the separation between said antenna means and said target body is an integral number of half wavelengths of said electrical oscillations, and to permit said trigger means to trigger only when said control signal varies to an extent indicative of a separation between said antenna means and said target body of less than one-half wavelength of said electrical oscillations.

Preferably the arrangement is adapted so that the body of the missile for which the fuze is intended to be used serves as said antenna means.

Figure 2:
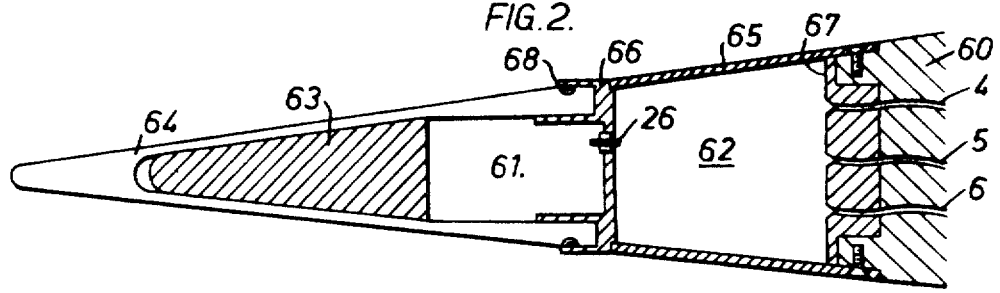
Figure 3:
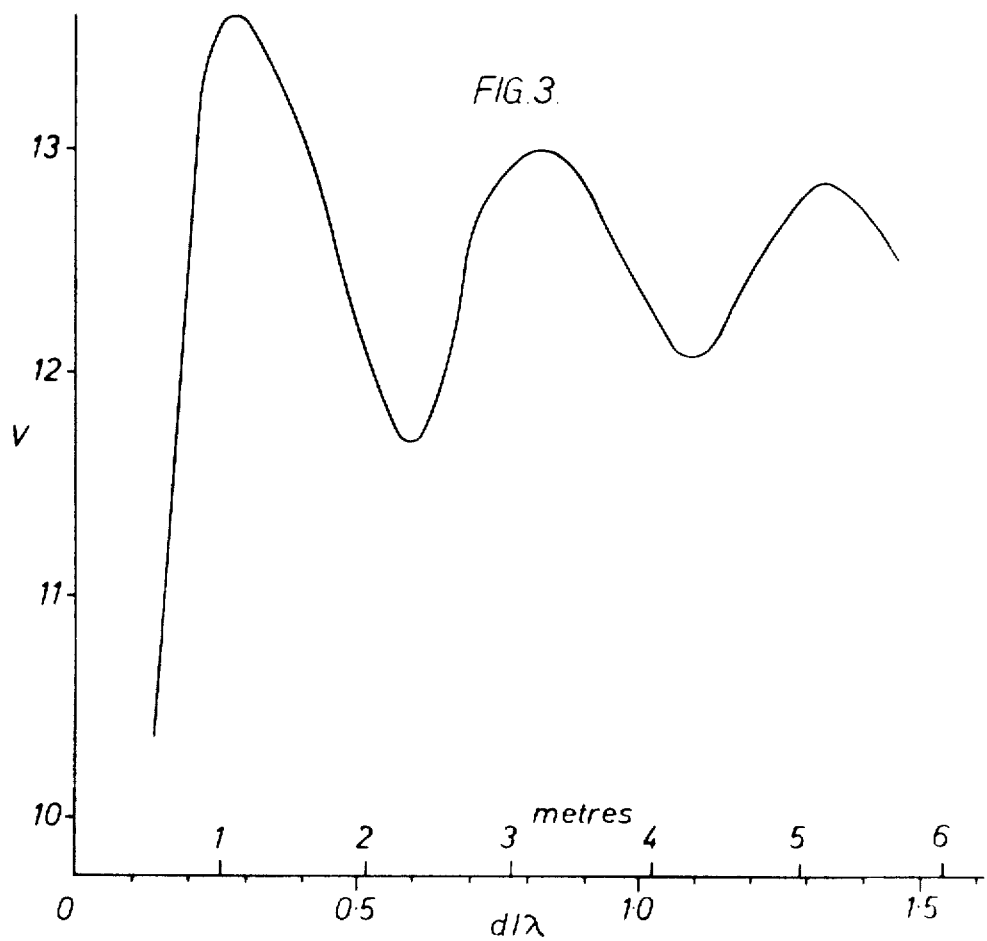
Figure 5:
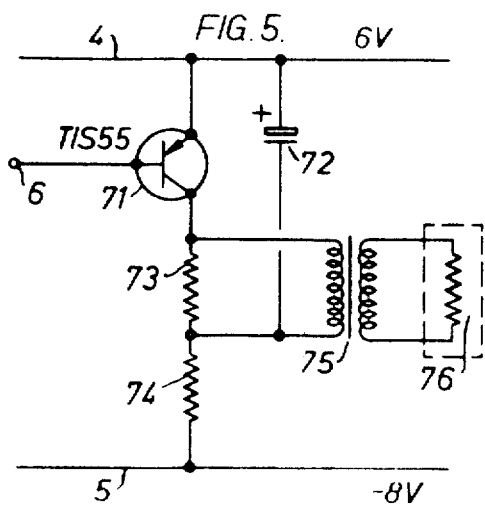

In order that the invention may be clearly understood and readily carried into effect it will now be described by way of example with reference to the accompanying drawings in which:

FIG. 1 is the circuit diagram of a proximity fuze according to the invention,

FIG. 2 is a longitudinal cross section view of the nose cap of a missile showing the location of said fuze, FIGS. 3 and 4 are graphs illustrating the operation of said fuze, FIGS. 5 and 6 are circuit diagrams of intended to be used in conjunction with the arrangement shown in FIG. 1, and FIG. 7 illustrates, in block diagram form, an example of a fuze circuit according to the invention in which said fuze circuit discriminates between near miss and potential direct hit modes and triggers before impact in the latter case.

Referring to FIG. 1, the circuit comprises two parts, an oscillator/transmitter part shown to the left of the dashed line in the Figure and a trigger stage shown to the right of the dashed line in the Figure.

The oscillator/transmitter part includes a transistor 1 connected to operate as a Colpitts oscillator oscillating at a frequency of 80 mHz. The output of said oscillator is connected to the nose cap of the missile for which the fuze is intended and thereby energizes the missile body whereby the missile body and the fuze behave approximately as a half-wave dipole. The frequency of the oscillation is determined by the series tuned circuit comprising the coil 11, connecting the base of transistor 1 to the nose cap and the capacitance of said hose cap. The base of said transistor 1 is connected to the emitter thereof via two series connected capacitors 21 and 22 respectively and these, together with the base-emitter capacitance of the transistor determine the feedback ratio in said oscillator circuit. The emitter is connected to a −8 v. line 5 via a RF choke coil 13 and a resistor 31 connected in series, and a RF choke coil 12 is connected in shunt with capacitor 21. The transistor 1 is biassed by a voltage divider consisting of a resistor 32 and two series connected diodes 51, 52 connected from a 6 v. supply line 4 to the line 5, the junction between said diodes and resistor 32 being connected to the junction between capacitors 21 and 22. The collector is connected to said 6 v. supply line 4 via a resistor 33. The resistors 32 and 33 and the diodes 51, 52 are housed with the components of the trigger stage.

In operation the effective load on the oscillator changes in the presence of a target, and the change causes changes in the current taken by the oscillator from the supply line. Thus the voltage generated across the resistor 33 changes and it is the change in this voltage which is used to operate the trigger.

The oscillator is connected to the trigger stage via the feed through capacitors 26, 27 and 28 in the collector lead of transistor 1, the lead from the junction of capacitors 21 and 22 to the voltage divider chain 32, 51, 52 and the line 5 respectively.

The trigger stage includes a complementary pair of transistors 2 and 3 connected in a DC positive feedback loop as shown. The transistors 2 and 3 are normally both nonconducting, but a change in voltage across resistor 33 of about 1.5 v. which is applied to the base of transistor 2 is sufficient to render both transistors 2 and 3 highly conducting and produces a negative trigger step of 11 v. at the collector of transistor 3. The capacitor 23 is connected in the path from resistor 33 to the base of transistor 2 to prevent variations in the standing oscillator current with time and temperature "firing" the trigger by ensuring that only relatively fast changes in the oscillator current are allowed to reach the trigger circuit. The value of the capacitor 23 is determined by the expected rate of rise of the voltage across resistor 33 in use. The firing level of the trigger is accurately determined by the diodes 54, 55 together with the associated resistors 37, 38, 39 in the emitter-base circuit of transistor 2. The two diodes 54, 55 also provide compensation for variations in the voltage between base and emitter of transistor 2 with temperature. The time constant at the base of transistor 2 is approximately given by the product of the resistance and capacitance of 36 and 23, respectively and this mainly determines the width of the output pulse generated at the collector of transistor 3 when the trigger "fires." The capacitor 24 in the feedback circuit is used to improve the trigger pulse switching speed and diode 53 is used to clip positive changes of greater than 0.5 v. and provide possibly greater discrimination between the last two negative peaks as will be shown below.

The only adjustment which is likely to be required on test is the setting of the triggering level of the trigger circuit, and if this is required it can be provided by replacing resistor 33 by a potentiometer the tapping of which is taken to capacitor 23.

The circuit as described above is mounted in a nose cap which fixes on the front end of the missile shown shaded by diagonal lines at 60 in FIG. 2. The oscillator part and the trigger part, shown to the left and right respectively of the dashed line in FIG. 1 are housed in the two compartments 61 and 62 respectively (see FIG. 2). The compartment 62 has sufficient spare space for other circuits to be located therein if required. The oscillator parts are inserted in a polyethylene molding which supports the large coil 11, the end terminal of which is soldered to the brass aerial cap 63. A polyethylene cover is provided below the cap and the oscillator components are polyethylene encapsulated for rigidity through holes in this cover. The whole assembly is enclosed in a molded PTFE nose 64.

The trigger part components are mounted in a system component former and the assembly enclosed at both ends by a moulded wiring layout which is dipsoldered and resin encapsulated in the compartment 62 of a brass housing 65. Connections between the oscillator and trigger part are made via the feedthrough capacitors (shown at 26, 27, 28 in FIG. 1) one of which is shown in FIG. 2 at 26, in the top brass housing 66 which electrically shields the two parts. The top brass housing 66 and a brass retaining ring 67 are sweat-soldered to the housing 65. The PTFE nose 64 is packed and cemented into the top housing 66, the metal lip being pressed over a rubber ring 68 provided for sealing. The three leads 4, 5, 6 are the 6 v. line, the −8 v. line and the trigger pulse output respectively (also shown in FIG. 1), and these supply power from the missile to operate the fuze and supply the firing pulse to the missile. The length of the nose cap from the tip to the ring 67 is approximately 15 cm., and the diameter at said ring 67 approximately 4 cm.

The curve shown in FIG. 3 shows the form of the voltage appearing at the collector of transistor 1 when the fuze approaches a target in such a way that its longitudinal axis is parallel to the target plane. This represents the situation in practice when the missile would pass the target without hitting it. The ordinate represents voltage and the abscissa represents the ratio between distance, $d$, from the target and the wavelength, $\lambda$, of the oscillation transmitted from the oscillator, and it is also calibrated in distance in meters for the oscillator frequency used, namely 80 mHz. The curve shows that as a target is approached the effective load on the oscillator fluctuates when the target is close enough producing a number of negative peaks until at very close approach the voltage decreases considerably. It is this last decrease which is detected by the trigger circuit and used to fire the missile. It will be seen that if the trigger threshold is set at a value below approximately 11.6 v. the fuze will not fire on the negative peak at just over 2 meters, but will fire when the target is closer than approximately 0.6 meters as desired. The diode 53 as stated above by clipping positive changes of more than 0.5 v. seems to assist in discriminating between the last two negative peaks shown in FIG. 3.

The curve shown in FIG. 4 shows a curve similar to that shown in FIG. 3 but representing the situation when the fuze approaches a target in such a way that the longitudinal axis is perpendicular to the target plane. This represents the situation in practice when the missile would hit the target. In this case it will be seen that with the threshold set below 11.6 v. as described above the trigger will never fire because on close approach to the target the oscillator voltage after several fluctuations goes more positive instead of going negative as in the case described above.

The fuze described thus discriminates between near miss conditions, when it will fire, and direct hit conditions when it does not fire. This is desirable in practice since if a direct hit is achieved it is usually preferably to fire the missile by an impact device so that it explodes within the target. If it is fired by the proximity device it will probably fire earlier than is desired in these conditions.

If it is desired to use the fuze to detonate the missile in direct hit conditions also, then a second trigger circuit 100 can be provided as shown in FIG. 7 which responds to a positive change in the oscillator voltage. This trigger is, of course, connected in parallel with the trigger circuit including the transistors 2 and 3. The circuit 100 may be provided with a suitable delay to ensure that the missile detonates at the desired time in relation to the target.

The circuit shown in FIG. 1 provides an 11 v. pulse at the output terminal 6. This does not generally provide sufficient energy or potential to fire the missile directly. Further circuits will generally have to be provided for this purpose, and if they are not provided in the missile itself they can be incorporated in the fuze in the compartment 62 (FIG. 2) as indicated above. A typical ignitor for a missile requires a pulse of 45 v. with an energy of 40 microjoules. Two alternative circuits for providing this energy are shown respectively in FIGS. 5 and 6.

Both circuits use the existing 6 v. and −8 v. supply lines, 4 and 5 and have as their input the 11 v. trigger pulse supplied from the terminal 6 (FIG. 1). The circuit shown in FIG. 5 uses a single transistor 71, a collector load being constituted by the resistors 73, 74. A capacitor 72 is charged via resistor 74 and the primary of a transformer 75 is connected in shunt with resistor 73, the secondary of the transformer being connected to the ignitor 76 of the missile shown symbolically as a resistor. Said ignitor 76 has a maximum resistance of 150 Ω. When a negative pulse appears at terminal 6, connected to the base of transistor 71, said transistor switches on and saturates discharging capacitor 72 via the primary of transformer 75. The turns ratio of said transformer is chosen so that the required pulse is supplied to the ignitor 76.

The alternative circuit shown in FIG. 6 utilizes three transistors 81, 82 83 each connected as a common base amplifier in cascade. The input 6 is connected to the emitter of the first transistor 81 via a coupling capacitor 84, and the coupling capacitors 85, 86 are connected from the collector of transistor 81 to the emitter of transistor 82 and from the collector of transistor 82 to the emitter of transistor 83 respectively. The collector of transistor 83 is connected via the ignitor 76 to ground. Normally the transistors 81, 82, 83 are all nonconducting and the capacitors 84, 85, 86 charged to the full supply voltage. When an 11 v. negative pulse is applied at terminal 6 the emitter of transistor 81 changes from −8 v. to −19 v. and said transistor 81 switches on and saturates, its collector going to nearly −19 volts also. This process is repeated in the next two stages and thus there appears at the collector of transistor 83 a negative voltage swing of approximately 57 v. for the ignitor 76. The required energy is supplied by the discharge of the three capacitors 84, 85, 86 through the collector-emitter paths of the three transistors 81, 82, 83 into the ignitor 76.

In FIGS. 1, 5 and 6 suitable transistor types are indicated alongside the respective transistors.

What we claim is:

1. A proximity fuze including an oscillator for generating electrical oscillations for application to antenna means, a trigger circuit which is triggered when the current taken by said oscillator increases beyond a predetermined value to generate a pulse which can be used for detonation, but is not triggered by a predetermined decrease in the current taken by said oscillator, so that the trigger circuit is triggered in a near miss condition, but is not triggered when a direct hit will occur.

2. A proximity fuze according to claim 1 including a second trigger circuit which is operated when the current taken by said oscillator decreases by a predetermined amount to generate a pulse which can be used for detonation in a direct hit condition.

3. A proximity fuze including:
 a. an oscillating circuit for generating electrical oscillations,
 b. antenna means coupled to said oscillator circuit for radiating oscillation energy supplied by said circuit and for receiving portions of said energy reflected from a target body,
 c. trigger means having a normally quiescent state and arranged, when triggered from said state, to produce a fuzing signal,
 d. sensing means for producing a control signal representing the current drawn by said oscillator and for applying said signal to said trigger means in a sense to tend to trigger said trigger means as said current increases,
 e. said trigger means including a biassing circuit to prevent said trigger means from triggering on extrema of said control signal which occur each time the separation between said antenna means and said target body is an integral number of half wavelengths of said electrical oscillations, and to permit said trigger means to trigger only when said control signal varies to an extent indicative of a separation between said antenna means and said target body of less than one-half wavelength of said electrical oscillations.

4. A proximity fuze circuit according to claim 3 including second trigger means and means for applying said control signal also to said second trigger means in a sense to tend to trigger said second trigger means as said current decreases, said second trigger means including a biassing circuit to prevent said trigger means from triggering until said control signal varies to an extent indicative of a separation between said antenna means and said target body of less than one-half wavelength of said electrical oscillations.